United States Patent
Fu et al.

(10) Patent No.: US 9,571,375 B2
(45) Date of Patent: Feb. 14, 2017

(54) METHOD AND NODE FOR DETECTING SUBFRAME SEQUENCE ERROR IN INVERSE MULTIPLEXING

(71) Applicant: ZTE Corporation, Shenzhen (CN)

(72) Inventors: Xihua Fu, Shenzhen (CN); Xinling Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/768,243

(22) PCT Filed: Feb. 8, 2014

(86) PCT No.: PCT/CN2014/071893
§ 371 (c)(1),
(2) Date: Sep. 21, 2015

(87) PCT Pub. No.: WO2014/124589
PCT Pub. Date: Aug. 21, 2014

(65) Prior Publication Data
US 2016/0006636 A1 Jan. 7, 2016

(30) Foreign Application Priority Data
Feb. 17, 2013 (CN) .......................... 2013 1 0051897

(51) Int. Cl.
*H04L 12/26* (2006.01)
*H04B 10/07* (2013.01)
(Continued)

(52) U.S. Cl.
CPC .............. *H04L 43/10* (2013.01); *H04B 10/07* (2013.01); *H04J 3/1652* (2013.01); *H04J 14/08* (2013.01);
(Continued)

(58) Field of Classification Search
USPC ..................... 398/25, 58, 154, 202
See application file for complete search history.

(56) References Cited

U.S. PATENT DOCUMENTS 6,359,887 B1 * 3/2002 Brockhage ............ H04J 3/0632
370/394
6,553,029 B1 * 4/2003 Alexander ............ H04L 49/351
370/389

(Continued)

FOREIGN PATENT DOCUMENTS

CN  1441576 A  9/2003
CN  1852163 A  10/2006
(Continued)

OTHER PUBLICATIONS

International Search Report of PCT/CN2014/071893, dated May 19, 2014.
(Continued)

*Primary Examiner* — Agustin Bello
(74) *Attorney, Agent, or Firm* — Banner & Witcoff, Ltd.

(57) ABSTRACT

Disclosed are a method and a node for detecting subframe misordering, including that: a receiving node receives subframes from a transmitting node, and judges whether a trail trace identifier carried in each subframe received is same with a desired trail trace identifier of a subframe to be received; when the trail trace identifier carried in each subframe received is same with the desired trail trace identifier of the subframe to be received, judges whether a subframe number value carried in each subframe belongs to a range of desired subframe number values of the subframe to be received, and if it has been judged that the subframe number value carried in the received subframe does not belong to the range of desired subframe number values of the subframe to be received, determines that there is subframe misordering.

16 Claims, 7 Drawing Sheets

(51) Int. Cl.
*H04J 3/16* (2006.01)
*H04J 14/08* (2006.01)
*H04L 12/939* (2013.01)
*H04Q 11/00* (2006.01)

(52) U.S. Cl.
CPC ......... *H04L 49/552* (2013.01); *H04Q 11/0066* (2013.01); *H04J 2203/0094* (2013.01); *H04Q 2011/0083* (2013.01)

(56) References Cited

U.S. PATENT DOCUMENTS

| | | | | | |
|---|---|---|---|---|---|
| 7,065,103 | B1* | 6/2006 | Gagnon | ............... | H04J 3/0629 370/381 |
| 7,068,685 | B1* | 6/2006 | Sihvola | ............... | H04J 3/0608 370/474 |
| 7,889,989 | B2* | 2/2011 | Zhang | ............... | G06F 15/161 398/17 |
| 8,045,863 | B2* | 10/2011 | Meagher | ............... | H04J 3/047 370/356 |
| 8,072,983 | B2* | 12/2011 | Xiao | ............... | H04J 3/1652 370/230 |
| 8,155,145 | B2* | 4/2012 | Kocaturk | ............... | H04L 43/0852 370/469 |
| 8,953,433 | B1* | 2/2015 | Grammel | ............... | H04B 10/038 370/216 |
| 2003/0097472 | A1* | 5/2003 | Brissette | ............... | H04L 12/2602 709/245 |
| 2004/0126111 | A1* | 7/2004 | Cho | ............... | H04B 10/00 398/33 |
| 2007/0071447 | A1* | 3/2007 | Ozaki | ............... | H04B 10/25133 398/147 |
| 2007/0248121 | A1* | 10/2007 | Zou | ............... | H04J 3/1611 370/498 |
| 2008/0212961 | A1* | 9/2008 | Zhang | ............... | G06F 15/161 398/25 |
| 2009/0208218 | A1* | 8/2009 | Xiao | ............... | H04J 3/1652 398/83 |
| 2009/0252040 | A1* | 10/2009 | Kocaturk | ............... | H04L 43/0852 370/241 |
| 2009/0263132 | A1* | 10/2009 | Rafel | ............... | H04J 3/0682 398/66 |
| 2010/0067547 | A1* | 3/2010 | Katagiri | ............... | H04J 3/07 370/474 |
| 2011/0150468 | A1* | 6/2011 | Uchida | ............... | H04J 3/1658 398/45 |
| 2012/0230674 | A1* | 9/2012 | Yuan | ............... | H04J 3/14 398/17 |
| 2013/0114416 | A1* | 5/2013 | Rao | ............... | H04L 43/10 370/241 |
| 2013/0121685 | A1* | 5/2013 | Rao | ............... | H04J 14/0212 398/17 |
| 2013/0142511 | A1* | 6/2013 | Spraggs | ............... | H04J 14/0267 398/51 |
| 2014/0050205 | A1* | 2/2014 | Ahn | ............... | H04W 52/146 370/336 |
| 2015/0125158 | A1* | 5/2015 | El-Ahmadi | ............... | H04L 1/0057 398/135 |
| 2015/0181490 | A1* | 6/2015 | Nadas | ............... | H04W 36/023 370/331 |
| 2015/0215887 | A1* | 7/2015 | Nejatian | ............... | H04W 56/0045 370/350 |
| 2015/0229398 | A1* | 8/2015 | Lee | ............... | H04L 41/0663 398/66 |
| 2015/0365193 | A1* | 12/2015 | Connolly | ............... | H04J 14/08 398/52 |
| 2015/0381280 | A1* | 12/2015 | Shirai | ............... | H04B 10/508 398/79 |
| 2016/0006545 | A1* | 1/2016 | Fu | ............... | H04J 14/0227 398/49 |
| 2016/0006636 | A1* | 1/2016 | Fu | ............... | H04B 10/07 398/25 |
| 2016/0056886 | A1* | 2/2016 | Kitamura | ............... | H04L 49/552 398/5 |
| 2016/0057078 | A1* | 2/2016 | Su | ............... | H04J 3/1652 398/52 |
| 2016/0072609 | A1* | 3/2016 | Bhatnagar | ............... | H04J 14/0263 398/34 |
| 2016/0088534 | A1* | 3/2016 | Axmon | ............... | H04W 36/0083 370/252 |
| 2016/0156997 | A1* | 6/2016 | Hotchkiss | ............... | H04Q 11/0003 398/45 |
| 2016/0249299 | A1* | 8/2016 | Ahn | ............... | H04W 52/146 |

FOREIGN PATENT DOCUMENTS

| | | |
|---|---|---|
| CN | 101272182 A | 9/2008 |
| CN | 101471837 A | 7/2009 |
| CN | 101860889 A | 10/2010 |

OTHER PUBLICATIONS

European Search Report of Application No. EP14751519, dated Sep. 23, 2016.

B100 OMS-OCH-OTU-ODU Overhead Consideration (ZTE), ITU-T Draft; Study Period 2009-02012 International Telecommunication Union, Geneva, CH, vol. 11/15, Dec. 18, 2012, pp. 1-13.

B100g-zte-hw-comparison-base-a3-02, ITU-T Draft; Study Period 2009-2012, International Telecommunication Union, Geneva, CH, vol. 11/15, Dec. 18, 2012, pp. 1-9.

B100g-c2178-frame-structiona3-05, ITU-T Draft; Study Period 2009-2012, International Telecommunication Union, Geneva, CH, vol. 11/15, Dec. 18, 2012, pp. 1-4.

Xihua Fu ZTE Corporation PR China, Inverse Multiplexing for ODUS, c 1992, Rev. 1, ITU-T Draft; Study Period 2009-2012, International Telecommunication Union, Geneva, CH, vol. 6/15, 9/15, 11/15, 12/15, 14/15, Aug. 27, 2012, pp. 1-5.

X1HUA FU ZTE Corporation PR China, B100G OTUC/ODUC mis-order analysis; WD09, ITU-T Draft; Study Period 2013-2016, International Telecommunication Union, Geneva, CH, vol. 11/15, Feb. 18, 2013, pp. 1-3.

* cited by examiner

METHOD AND NODE FOR DETECTING SUBFRAME SEQUENCE ERROR IN INVERSE MULTIPLEXING

TECHNICAL FIELD

The present document relates to the optical transmission technical field, and particularly, to a method and a node for detecting subframe misordering in inverse multiplexing.

BACKGROUND OF THE RELATED ART

Optical transmission technology development trends present a single channel, a higher rate (e.g. single channel transmission at a rate of 400 G/1 T), higher frequency spectral efficiency and a high-order modulation mode, thereby the clearest and the most important direction of the development for the optical transmission is still to continue improving the rate. The high speed transmission faces with many restrictions, there are two main aspects: on one aspect, the optical transmission technology develops to high frequency spectral efficiency convergence transmission and high service interface transmission, if the frequency spectral efficiency cannot continue to be improved, the retransmission converging from a low speed to a high speed makes little sense, since there may be a high speed Ethernet interface at client side, it still needs to consider the problem of the high speed interface transmission, 400 G will be a critical point in the spectrum efficiency limit; in another aspect, the optical transmission technology develops to a long distance (a long span and multiple spans), although a system Optical Signal to Noise Ratio (OSNR) is improved by means of adopting a low-loss fiber, a low noise amplifier, and reduction of span spacing, etc., but the improvement is limited and it is difficult to achieve a significant breakthrough and implement in engineering.

With the increasing demand for the bearer Network bandwidth, the Beyond-100 G technology has become a solution for solving the increasing demand for the bandwidth, above the 100 G, no matter it is 400 G or 1 T, Wavelength Division Multiplexing (WDM) of the conventional 50 GH Fixed Grid cannot provide sufficient frequency spectrum width to achieve the Beyond-100 G technology. Due to the defects of the fixed grid, it is needed to propose a wider flexible grid. In the related art, multiple rates maxing transmission of the beyond-100 G and the flexibility of the modulation mode for the beyond-100 G case to different demands for the channel bandwidths, if an appropriate bandwidth is tailored for each channel, it can realize the full use of the system width, thereby resulting in a flexible grid system. For the demand for a ultra-high speed WDM system based on the increasing bandwidth demand, thereby a demand for the Flexible Grid technology is introduced, the introduction of the Flexible Grid technology will result in that frequency spectrum fragments will occur. The beyond-100 G service, for example, when the Ethernet service of a 1 T rate are transmitted on an optical layer, it is impossible to find a successive frequency spectrum, of which frequency spectrum width is large enough, to transmit the service, thereby it is needed to inversely multiplex a electrical layer container of a 1 T rate to a plurality of non-successive frequency spectrum to be transmitted, therefore the frequency spectrum utilization can be improved and frequency spectrum fragment resources will be used as much as possible. In addition, optical devices for coherent receiving technology are provided, the optical devices can dynamically and correctly receive optical signals according to configured information to be received, such as the center frequency, frequency spectral width and modulation mode, etc.

After the inverse multiplexing is introduced in the related art, the problem of subframe misordering occurs, which causes that the receiving node cannot assemble the subframes into a complete frame after receiving the subframes, at present, the effective solution about how to determine, by a receiving node, whether the subframe misordering occurs, has not been proposed yet.

SUMMARY OF THE INVENTION

The embodiments of the present document provide a method and a node for detecting subframe misordering in inverse multiplexing, which is able to effectively detect the subframe misordering after the inverse multiplexing is further introduced.

The embodiments of the present document provide a method for detecting subframe misordering in inverse multiplexing, comprising:

a receiving node receiving subframes from a transmitting node, judging whether a trail trace identifier carried in each subframe received is same with a desired trail trace identifier of a subframe to be received; and if the trail trace identifier carried in each subframe received is same with the desired trail trace identifier of the subframe to be received, the receiving node judging whether a subframe number value carried in each subframe belongs to a range of desired subframe number values of the subframe to be received, and if it has been judged that the subframe number carried in the received subframe does not belong to the range of the desired subframe number values of the subframe to be received, determining that there is subframe misordering.

Alternatively, when the subframe is an optical channel transport unit for continue rate (OTUC) subframe, the desired trail trace identifier of the subframe to be received is a trail trace identifier carried in an OTUC subframe under an OTUC High-speed Administrative Group (OTUCnAG) to be received, wherein OTUC subframes under a same OTUCnAG carries same trail trace identifiers.

Alternatively, when the subframe is an optical channel data unit for continue rate (ODUC) subframe, the desired trail trace identifier of the subframe to be received is a trail trace identifier carried in an ODUC subframe under an ODUC high-speed (ODUCn) to be received, wherein ODUC subframes under a same ODUCn carry same trail trace identifiers.

Alternatively, a receiving node receiving subframes from a transmitting node, comprises: receiving OTUC subframes under a plurality of OTUC high-speed transport groups (OTUCmTG) to which an OTUCnAG to be received has been inversely multiplexed, respectively; wherein the range of the desired subframe number values of the subframe to be received is a range of the subframe number values of the OTUC subframe in the OTUCnAG in the OTUCmTG under the OTUCnAG to be received; and judging whether a subframe number value carried in each subframe belongs to a range of desired subframe number values of the subframe to be received, comprises: judging whether a subframe number value carried in each OTUC subframe under each OTUCmTG received belongs to a range of subframe number values of the OTUC subframe in the OTUCnAG in a corresponding OTUCmTG under the OTUCnAG to be received, if it has been judged that a subframe number value carried in the received subframe does not belong to the range of subframe number values of the OTUC subframe in the OTUCnAG in the corresponding OTUCmTG, determining that there is subframe misordering.

Alternatively, a receiving node receiving subframes from a transmitting node, comprises: receiving ODUC subframes under a plurality of OTUCmTGs to which a plurality of the ODUCmTGs, to which the ODUCn to be received is inversely multiplexed, are respectively mapped; wherein the range of desire subframe number values of the subframe to be received is a range of subframe number values of the OTUC subframe in ODUCn in the ODUCmTG under the ODUCn; and judging whether a subframe number value carried in each subframe belongs to a range of desired subframe number values of the subframe to be received, comprises: judging whether a subframe number value carried in each ODUC subframe under each ODUCmTG received belongs to a range of subframe number values of an ODUC subframe in the ODUCn in a corresponding ODUCmTG under an ODUCn to be received, if it has been judged that the subframe number value carried in the received subframe does not belong to the range of the subframe number values of the ODUC subframe in the ODUCn in the corresponding ODUCmTG, determining that there is subframe misordering.

Alternatively, the desired trail trace identifier of the subframe to be received is configured for the receiving node by an administration plane or a control plane; the range of the desire subframe number values is configured for the receiving node by the administration plane or the control plane.

Alternatively, after judging that the trail trace identifier carried in the received subframe is different from the desired trail trace identifier of the subframe to be received, the receiving node determines that there is subframe misordering; and After determining that there is subframe misordering, the receiving node generates an alarm for the subframe misordering.

Alternatively, a node comprises: a receiving unit, a first judging unit and a second judging unit, and wherein:
the receiving unit is configured to receive subframes from a transmitting node;
the first judging unit is configured to judge whether a trail trace identifier carried in each subframe received is same with a desired trail trace identifier of a subframe to be received; and
the second judging unit is configured to, when the first judging unit has judged that the trail trace identifier carried in each subframe received is same with the desired trail trace identifier of the subframe to be received, judge whether a subframe number value carried in each subframe belongs to a range of desired subframe number values of the subframe to be received, and if it has been judged that the subframe number value carried in the received subframe does not belong to the range of the desired subframe number values of the subframe to be received, determine that there is subframe misordering.

Alternatively, when the subframe is an optical transport unit for continue rate (OTUC) subframe, the desired trail trace identifier of the subframe to be received is a trail trace identifier carried in an OTUC subframe under an OTUC high-speed administrative group (OTUCnAG) to be received, wherein OTUC subframes under a same OTUC-nAG carry same trail trace identifiers Alternatively, when the subframe is an optical channel data unit for continue rate (ODUC) subframe, the desired trail trace identifier of the subframe to be received is a trail trace identifier carried in an ODUC subframe under an ODUC high-speed (ODUCn) to be received, wherein ODUC subframes under a same ODUC carry same trail trace identifiers.

Alternatively, the receiving unit is configured to receive OTUC subframes under a plurality of OTUC high-speed transport group (OTUCmTG) to which an OTUCnAG to be received is inversely multiplexed, respectively; wherein the range of the desired subframe number values of the subframe to be received is a range of the subframe number values of the OTUC subframe in the OTUCnAG in the OTUCmTG under the OTUCnAG to be received; and the second judging unit is configured to judge whether a subframe number value carried in each OTUC subframe under each OTUCmTG received belongs to a range of subframe number values of the OTUC subframe in the OTUCnAG in a corresponding OTUCmTG under the OTUCnAG to be received, if it has been judged that the subframe number value carried in the received subframe does not belong to the range of the subframe number values of the OTUC subframe in OTUCnAG in the corresponding OTUCmTG, determine that there is subframe misordering.

Alternatively, the receiving unit is configured to receive ODUC subframes under a plurality of ODUCmTGs to which a plurality of the ODUCmTGs, to which the ODUCn to be received is inversely multiplexed, are mapped respectively; wherein the range of desire subframe number values of the subframe to be received is a range of subframe number values of the OTUC subframe in ODUCn in the ODUCmTG under the ODUCn to be received; and the second judging unit is configured to judge whether a subframe number value carried in each ODUC subframe under each ODUCmTG received belongs to a range of subframe number values of an ODUC subframe in the ODUCn in a corresponding ODUCmTG under an ODUCn to be received, if it has been judged that the subframe number value carried in the received subframe does not belong to the range of the subframe number values of the ODUC subframe in the ODUCn in the corresponding ODUCmTG, determine that there is subframe misordering.

In conclusion, in the embodiments of the present document, when the trail trace identifier carried in each subframe received is same with the desired trail trace identifier of the subframe to be received, it is to judge that whether the subframe number value carried in each subframe belongs to the range of the desired subframe number values of the subframe to be received, therefore it can more accurately and effectively detect whether subframe misordering occurs.

PREFERRED EMBODIMENTS OF THE INVENTION

At present, the Beyond-100 G technology has become a solution of solving the increasing demand for the bandwidth, above the 100 G, no matter it is 400 G or 1 T, Wavelength Division Multiplexing (WDM) of the conventional 50 GH Fixed Grid cannot provide sufficient frequency spectrum width to implement the beyond-100 G technology. Due to the defects of the fixed grid, it is needed to propose a wider flexible grid.

Figure 1:
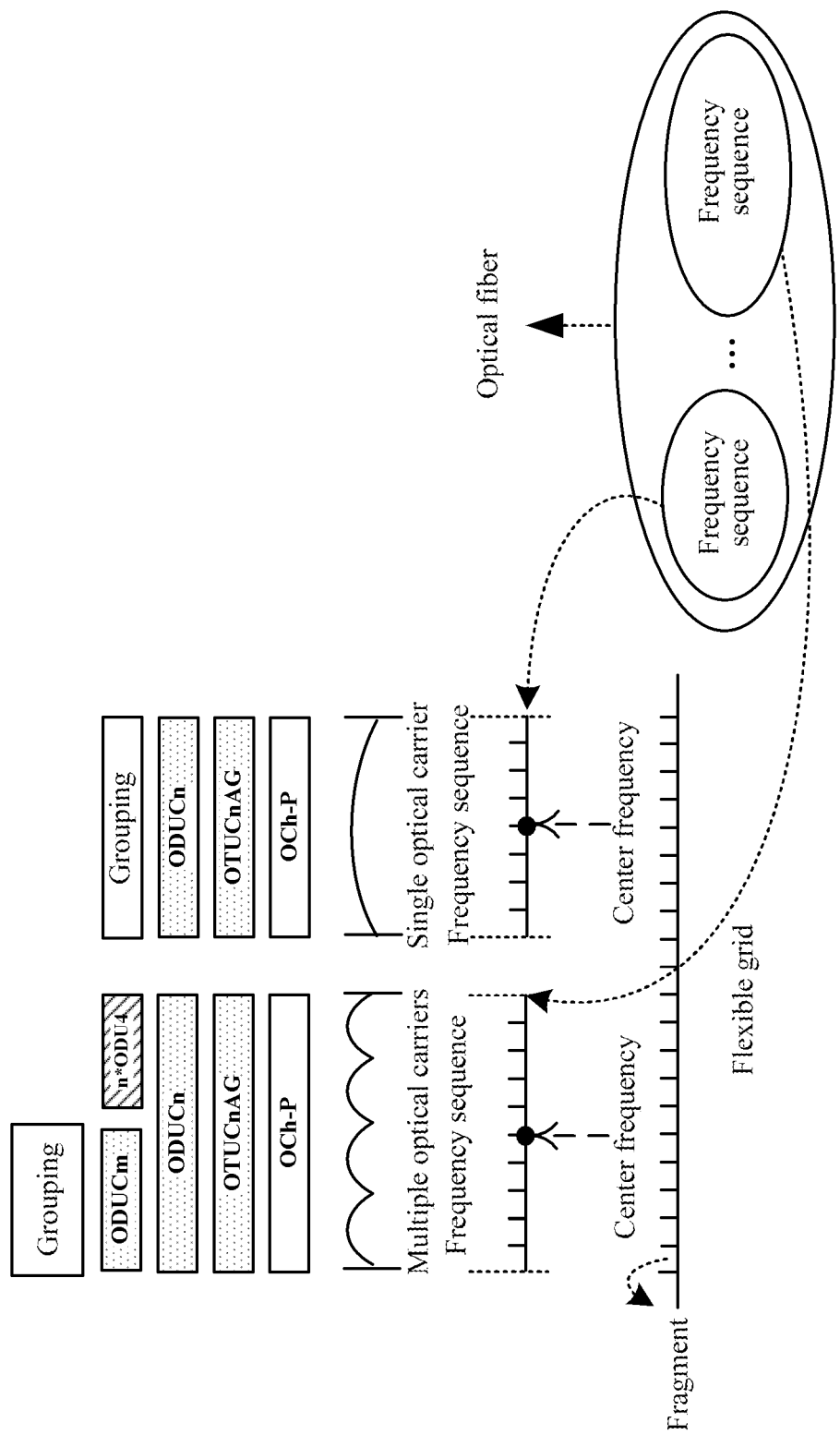
FIG. 1 is a schematic diagram of a processing flow of ODUCn-OTUCnAG-OChAG mapping and multiplexing in the related art.

As shown in FIG. 1, an ODUCn loading a beyond-100 G service is finally transported in an optical layer by mapping and multiplexing processing of ODUCn-OTUCnAG-OChAG. An OChAG at least includes one OCh-P. As shown in FIG. 1, packet service data are mapped to an ODUC high-speed (ODUCn, which represents a high rate than ODUk (k=0,1,2,2e,3,4)), and the ODUCn is mapped to an OTU High-speed Administrative Group (OTUCnAG), and the OTUCnAG is mapped to an OCh Administrative Group (OChAG); wherein rates of the ODUCn, OTUCnAG and OChAG are N times of 100 gigabits per second, a rate of an ODUCn branch is 100 gigabits per second, N is a positive integer greater than or equal to 2.

It is illustrated that, the OTUCnAG is an OTU High-speed Administrative Group, which is a composite signal of N*100 gigabits per second, and composed of N 100 G OTU frames, for example, OTUC2AG is 200 gigabits per second, and OTUC4AG represents 400 gigabits per second; OChAG represents a set of optical channel signals used to bear the OTUCnAG, if these optical channel signal pass through a same route, the OChAG provides a single entity to administrate these signals; if these signals pass through different routes, a plurality of optical channels (OCh) are needed, the signals passing through the same route are administered by one optical channel. An ODU4 bearing a low-order optical channel data unit (ODUk) or packet service data can also be combined with a low-order ODUCm (m<n) bearing packet service data to multiplex to a high-order ODUCn, wherein, the ODUk at least comprises one of the following: ODU0, ODU1, ODU2, ODU2e, ODU3, and ODUflex; and the high-order ODUCn is mapped to the OTUCnAG.

The introduction of the Flexible Grid technology will result in that frequency spectrum fragments will occur. The beyond-100 G service, for example, when the ethernet service of a 1 T rate are transmitted on an optical layer, it is impossible to find a successive frequency spectrum, of which frequency spectrum width is large enough, to transmit the service, thereby it is needed to inversely multiplex a electrical layer container of a 1 T rate to multiple non-successive frequency spectrum for transmitting, therefore the frequency spectrum utilization can be improved and frequency spectrum fragment resources will be used as much as possible.

Figure 2:
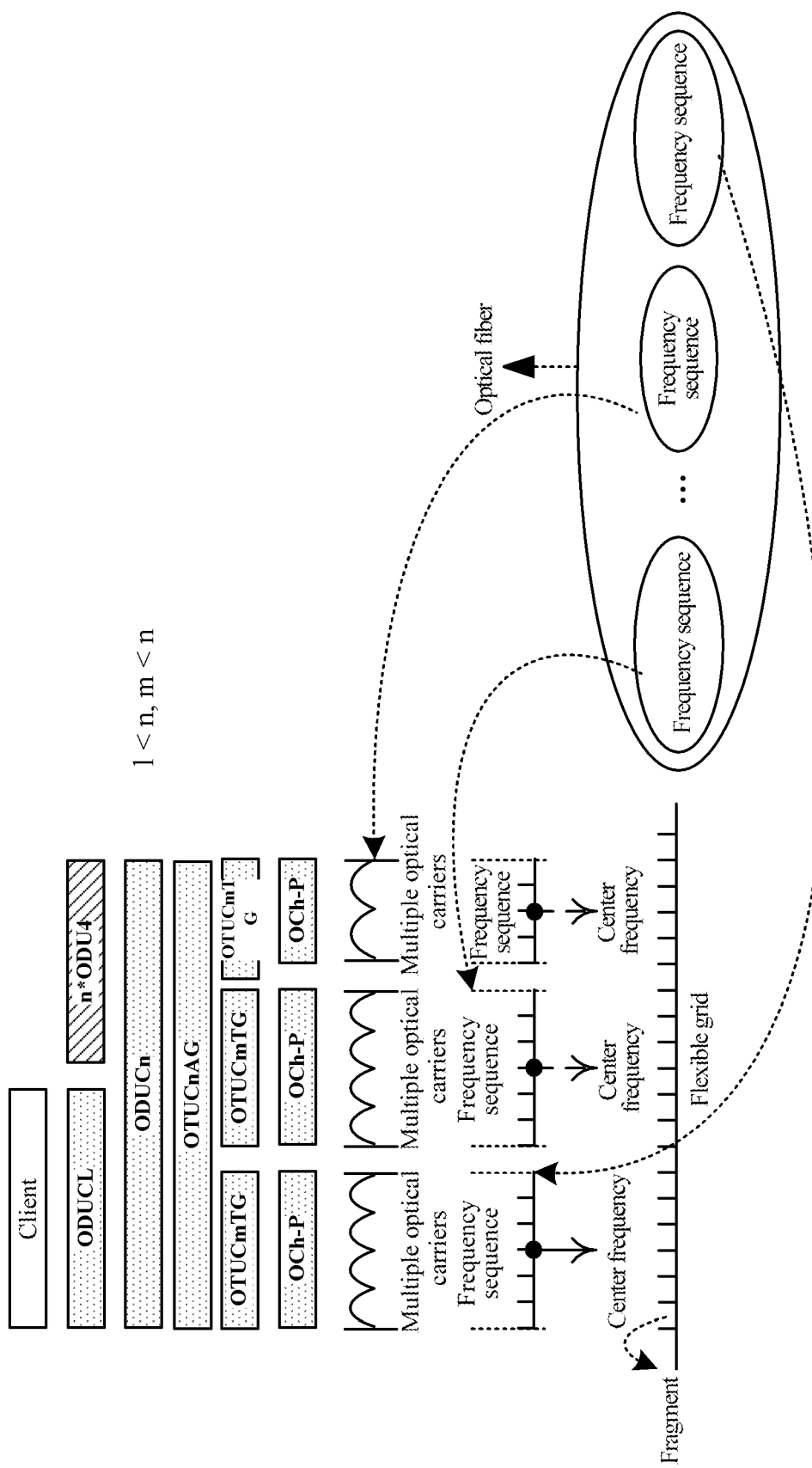
FIG. 2 is a schematic diagram of a processing flow of ODUCn-OTUCnAG-z*OTUCmTG-OChAG mapping and multiplexing in the related art.

FIG. 2 depicts an inverse multiplexing method and is a schematic diagram depicting the ODUCn-OTUCnAG-z*OTUCmTG-OChAG mapping and multiplexing processing, wherein, a plurality of optical signals contained in the OChAG are born by discrete frequency spectrum and pass through different routes, as shown in FIG. 2, the ODUCn is mapped to the OTUCnAG, and then the OTUCnAG is mapped to the OChAG, which comprises: the OTUCnAG is inversely multiplexed to a plurality of OTUC high-speed transport groups (OTUCmTG), and then the OTUCmTG is mapped to a corresponding optical channel (OCh); wherein, the rates of the OTUCmTGs are all M times of 100 gigabits per second, M is greater than or equal to 1 and M is less than N. An OTUCm Transport Group (OTUCmTG, m<n) is a composite signal and is a signal of m*100 gigabits per second. Each of the OTUCmTGs has a same rate level, or all the OTUCmTGs have different rate levels.

Figure 3:
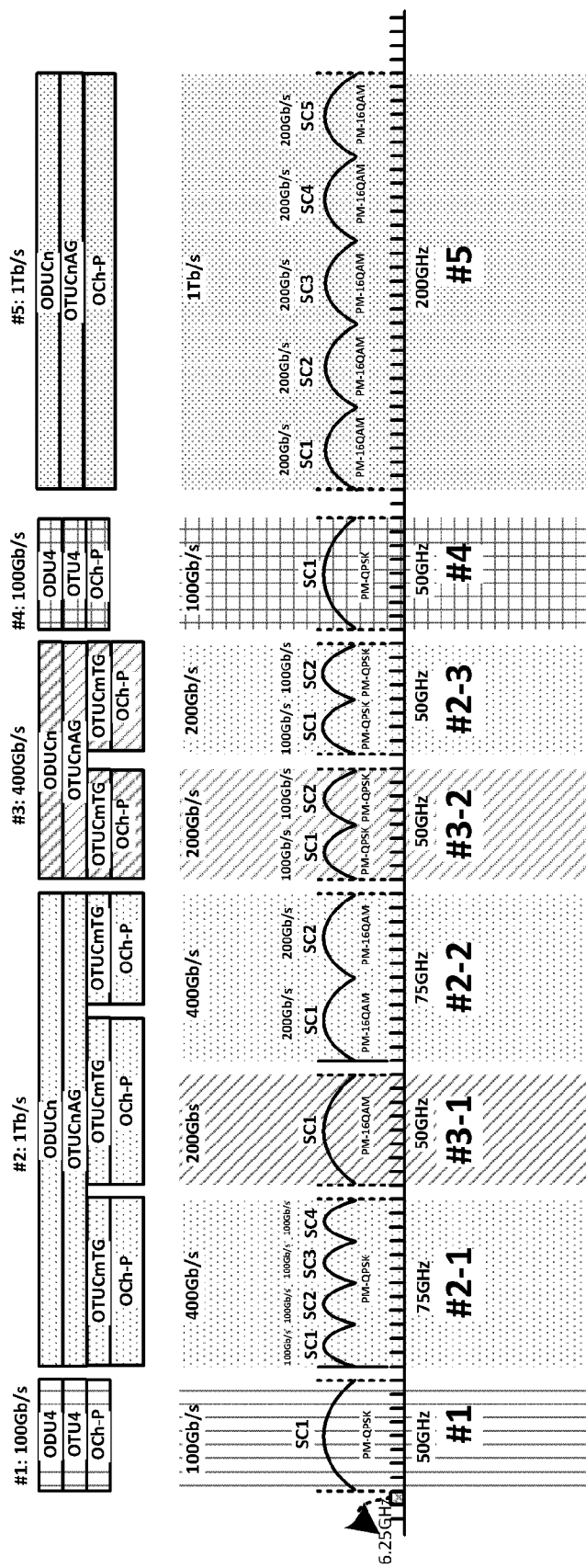
FIG. 3 is a schematic diagram of a processing flow of five signals mapping and multiplexing on a same optical fiber and optical signal transporting in the related art.

FIG. 3 provides an inverse multiplexing example according to the inverse multiplexing process described in FIG. 2, and is a schematic diagram of five signals being mapped and multiplexed on a same optical fiber and a flow of the optical signal transport processing, as shown in FIG. 3, there are five services transported on the same optical fiber, #1 and #4 are signals of 100 gigabits per second, each of which occupies 50 GHz frequency spectrum resource respectively and adopts single-carrier transmission of a Polarization-multiplexed Quadrature Phase Shift Keying (PM-QPSK) modulation mode.

2 is a signal of 1 Tbit/s, the OTUCnAG is supported by three optical channels OCh-Ps, each OCh-P corresponds to a media channel, the bit rate of two OCh-Ps corresponding to the media channels #2-1 and #2-2 is 400 Gbit/s; the media channels #2-1 is transported by four subcarriers (SC) SC1, SC2,SC3,SC4, all of which adopt the PM-QPSK modulation mode, the rate of each subcarrier is 100 gigabits per second, occupying 75 GHz frequency spectrum resource in total; the media channel #2-2 is transported by two subcarriers (SC) SC1,SC2, each of which adopts a PM-16QAM modulation mode, the rate of each subcarrier is 200 gigabits per second, occupying 75 GHz frequency spectrum resource in total; the bit rate of the media channel #2-3 corresponding to the rest one OCh-P is 200 gigabits per second, the media channel #2-3 is transported by two subcarrier SC1 and SC1, both of which adopt the PM-QPSK modulation mode, the bit rate of each subcarrier is 100 gigabits per second, occupying 50 GHz frequency spectrum resource in total.

3 is a signal of 400 Gbit/s, payload of the OTUCnAG signal is supported by two OCh-Ps, each of the OCh-Ps corresponds to one media channel, the rates of the media channels #3-1 and #3-2 corresponding to two OCh-Ps are 200 Gbit/s; the media channel #3-1 is transported by the single subcarrier SC1 which adopts the PM-16QAM modulation mode, occupying 50 GHz frequency spectrum resource. The media channel #3-2 is transported by two subcarriers SC1, SC2, both of which adopt the PM-QPSK modulation mode, the rate of each subcarrier is 100 gigabits per second, occupying 50 GHz frequency spectrum resource in total;

5 is a signal of 1 Tbit/s, payload of the OTUCnAG signal is supported by one OCh-P, a media channel corresponding to the OCh-P is transported by five subcarriers SC1, SC2, SC3, SC4 and SC5, all of which adopt the PM-16QAM modulation mode and occupy 200 GHz frequency spectrum resource, and the bit rates of the subcarriers are 200 Gbit/s.

Figure 4:
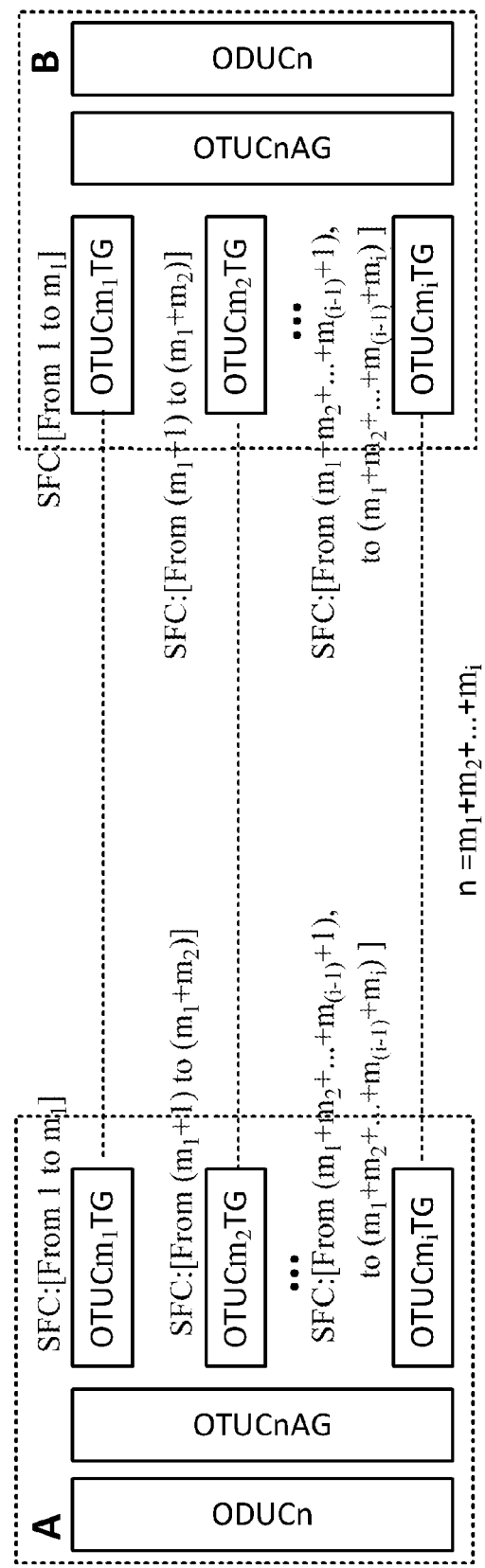
FIG. 4 is a schematic diagram of inverse multiplexing in the embodiment.

As shown in FIG. 4, at a node A, an ODUCn (the rate is n*100 Gbit/s) container is mapped to an OTUCnAG, and the OTUCnAG (the rate is n*100 Gbit/s) is inversely multiplexed to a plurality of OTUCm transport group (OTUCmTG), which are OTUCm1TG, OTUCm2TG . . . , OTUCm (i−1)TG and OTUCmiTG respectively and are formed by means of m1, m2 . . . m(i−1) and OTUC subframes byte-interleaving, the OTUC subframe is a subframe of 4*4080 currently defined in G.709. After these OTUCmTGs are transported to a node B at far-end, a complete OTUCnAG frame is further assembled by means of byte-interleaving, a structure of the OTUCnAG frame is 4 rows and 4808*n columns. To assemble these OTUCmTGs into an OTUC-nAG at the node B correctly, the subframe number value of an OTUC subframe in the OTUCnAG is carried in overhead of each OTUC subframe in each OTUCmTG. Furthermore, Trail Trace Identifiers (TTI) carried in overhead of all the OTUC subframes in one OTUCnAG are required to be the same, indicating that these OTUC subframes belong to the same OTUCnAG. TTIs carried in overhead of all the OTUC subframes in another different OTUCnAG are required to be different from the TTIs carried in overhead of all the OTUC subframes in other OTUCnAGs.

For example, two OTUC10AGs (the rates of both are 1 Tbit/s) are inversely multiplexed to three OTUCmTGs, which are two OTUC4TGs (the rates are 400 Gbit/s) and one OTUC2TG (the rate is 200 Gbit/s) respectively, TTI values carried in overhead of all OTUC subframes in a first OTUC10AG are TTI1, subframe number values carried in overhead of 10 OTUC subframes are 1 to 10. TTI values carried in overhead of all OTUC subframes in a second OTUC10AG are TTI2, subframe number values carried in overhead of 10 OTUC subframes are 1 to 10.

In a real system, for example, due to the wrong configuration of the cross-matrix, the node B would receive a wrong OTUC subframe, for example, a certain OTUC4TG subframe in the first OTUC10AG is received by the second OTUC10AG, but the OTUC4TG belonging to the second OTUC10AG is received by the first OTUC10AG, which will cause that the OTUC10AGs cannot be assembled correctly.

Therefore, in the embodiment, before the $OTUCm_1TG$, $OTUCm_2TG$, $OTUCm_{(i-1)}TG$ and $OTUCm_iTG$ are transported to a node at the far-end (e.g. a node B), a desired trail trace identifier (called a desired TTI for short in following) needs to be configured for the node at the far-end by an administration plane and a control plane, at this point the desired trail trace identifier is a trail trace identifier carried in the OTUC subframe under the OTUCmAG to be received, and at this point, a range of desired subframe number values of the subframe to be received (called a range of desired subframe number values for short in following) is a range of subframe number values of all OTUC subframes in the OTUCnAG in OTUCmTG under the OTUCnAG to be received. After receiving $OTUCm_1TG$, $OTUCm_2TG$, $OTUCm_{(i-1)}TG$ and $OTUCm_iTG$, the receiving node firstly compares whether the TTI value carried in the overhead of the OTUC frame equals to the configured desired TTI value of each received OTUC frame, if the TTI value carried in the overhead of the OTUC frame does not equal to the configured desired TTI value, an alarm for subframe misordering is generated. Otherwise, it is to compare whether the subframe number values of all the OTUC subframes in the OTUCmTG belong to the configured range of the desired subframe number values. If the subframe number values of all the OTUC subframes in the OTUCmTG do not belong to the configured range of the desired subframe number values, it is to generate the alarm for subframe misordering, otherwise, it is not needed to generate any alarm.

Figure 5:
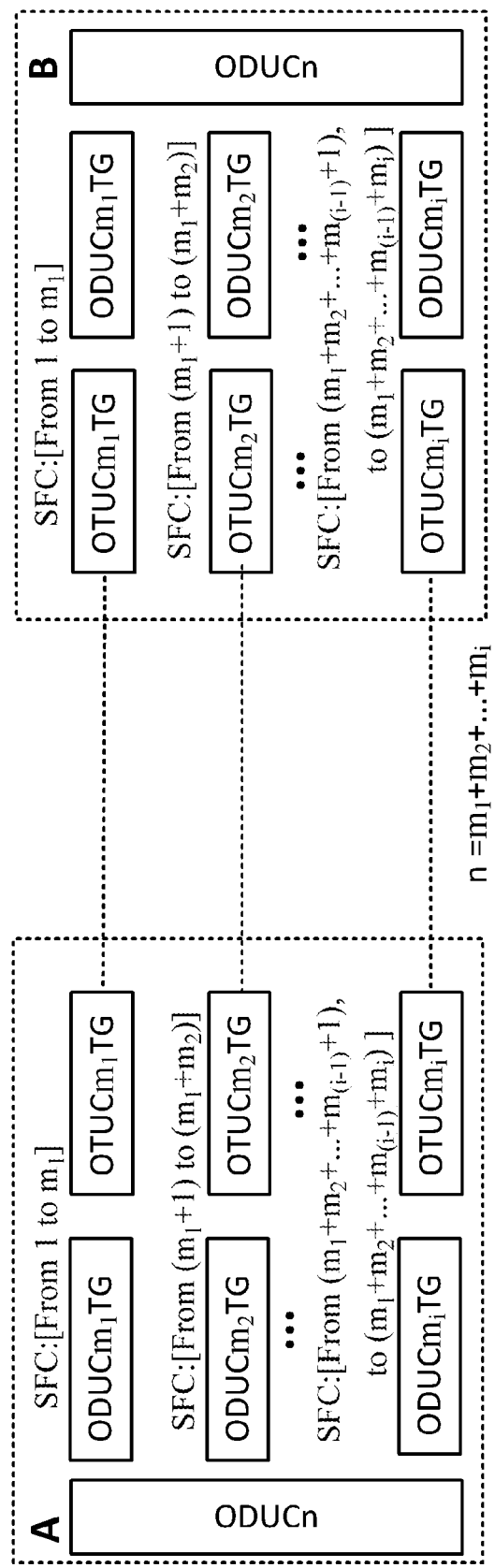
FIG. 5 is a schematic diagram of another kind of inverse multiplexing in the embodiment.

As shown in FIG. 5, at a node A, an ODUCn (the rate is n*100 Gbit/s) is inversely multiplexed to a plurality of ODUCm transport groups (ODUCmTG), which are $ODUCm_1TG$, $ODUCm_2TG$ . . . $ODUCm_{(i-1)}TG$ and $ODUCm_iTG$ respectively and are formed by means of $m_1$, $m_2$ . . . $m_{(i-1)}$ and $m_i$ ODUC subframes byte-interleaving, the ODUC subframe is a subframe of 4*3824 currently defined in G.709. After these ODUCmTGs are mapped to the OTUC-mTG and transported to a node B at far-end, the node B assembles a complete ODUCn frame again by means of byte-interleaving, a structure of the ODUCn frame is 4 rows and 3824*n columns. To assemble these ODUCmTGs into an ODUCn at the node B correctly, the subframe number value of an ODUC subframes in the ODUCn is carried in overhead of each ODUC subframe in each ODUCmTG. Furthermore, trail trace identifiers (TTI) carried in overhead of all the ODUC subframes in one ODUCn are required to be the same, indicating that these ODUC subframes belong to the same ODUCn. TTIs carried in overhead of all the ODUC subframes in another different ODUCn are required to be different from the TTIs carried in overhead of all the ODUC subframes in other ODUCns.

For example, two ODUC10s (the rates are 1 Tbit/s) are inversely multiplexed to three ODUCmTGs, which are two ODUC4TGs (the rates are 400 Gbit/s) and one ODUC2TG (the rate is 200 Gbit/s) respectively, TTI values carried in overhead of all ODUC subframes in the first ODUC10 are TTI1, subframe number values carried in overhead of 10 ODUC subframes are 1 to 10. TTI values carried in overhead of all ODUC subframes in the second ODUC10 are TTI2, subframe number values carried in overhead of 10 ODUC subframes are 1 to 10.

In a real system, for example, due to the wrong configuration of the cross-matrix, the node B would receive a wrong ODUC subframe, for example, a certain ODUC4TG subframe in the first ODUC10 is received by the second ODUC10, but the ODUC4TG belonging to the second ODUC10 is received by the first ODUC10, which will cause that the ODUCn cannot be assembled correctly.

Therefore, in the embodiment, before the $ODUCm_1TG$, $OTDCm_2TG$, $ODUCm_{(i-1)}TG$ and $ODUCm_iTG$ are transported to a node at the far-end (e.g. a node B), the desired TTI needs to be configured for the node at the far-end by an administration plane and a control plane, at this point the desired TTI is a trail trace identifier carried in the ODUC subframe under the ODUCn to be received, and at this point, a range of desired subframe number values is a range of subframe number values of all ODUC subframes in the ODUCn in ODUCmTG under the ODUCn to be received. After receiving $ODUCm_1TG$, $ODUCm_2TG$, $ODUCm_{(i-1)}TG$ and $ODUCm_iTG$, the receiving node firstly compares whether the TTI value carried in the overhead of the ODUC frame equals to the configured desired TTI value of each received ODUC frame, if the TTI value carried in the overhead of the ODUC frame does not equal to the configured desired TTI value, an alarm for subframe misordering is generated. Otherwise, it is to compare whether the subframe number values of all the ODUC subframes in the ODUCmTG belong to the configured range of the desired subframe number values. If the subframe number values of all the ODUC subframes in the ODUCmTG do not belong to the configured range of the desired subframe number values, it is to generate the alarm for subframe misordering, otherwise, it is not needed to generate any alarm.

The embodiments of the present document will be described in detail below by referring to accompanying drawings and in combination with embodiments. It should be noted that the examples in the present document and the characteristics in the examples can be combined with each other in the condition of no conflict.

Embodiment One

Figure 6:
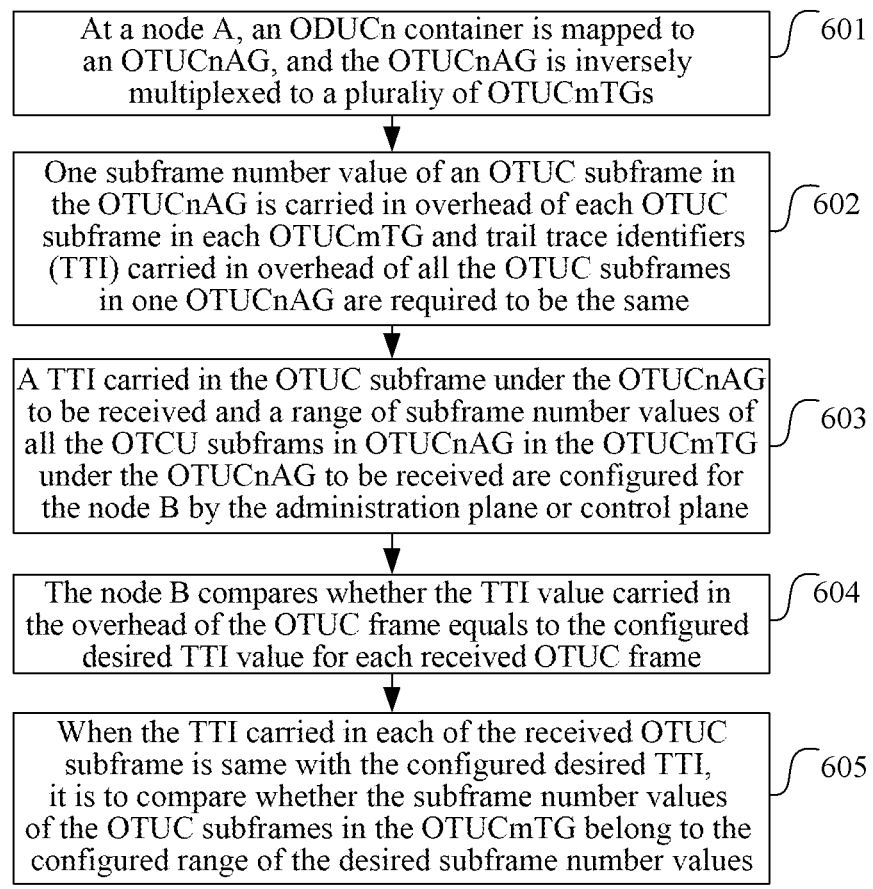
FIG. 6 is a flowchart of a method of detecting subframe misordering in inverse multiplexing in the embodiment corresponding to FIG. 4.

As shown in FIG. 4 and FIG. 6, the embodiment provides the method for detecting misordering by illustrating that misordering occurs for an OTUC subframe in an OTUCnAG in a node B, which solves the problem that, after misordering occurs for the OTUC subframe in the OTUCnAG, the OTUCnAG frame cannot be assembled correctly.

In step 601, at a node A, an ODUCn (the rate is n*100 Gbit/s) container is mapped to an OTUCnAG, and the OTUCnAG is inversely multiplexed to a plurality of OTUCm transport groups (OTUCmTG), which are OTUCm$_1$TG, OTUCm$_2$TG . . . , OTUCm$_{(i-1)}$TG and OTUCm$_i$TG respectively and are formed by means of m$_1$,m$_2$ . . . m$_{(i-1)}$ and m$_i$ OTUC subframes byte-interleaving respectively;

The OTUC subframe is a subframe of 4*4080 currently defined in G.709.

In step 602, one subframe number value of an OTUC subframe in the OTUCnAG is carried in overhead of each OTUC subframe in each OTUCmTG and trail trace identifiers (TTI) carried in overhead of all the OTUC subframes in one OTUCnAG are required to be the same, indicating that these OTUC subframes belong to the same OTUCnAG.

In the embodiment, one subframe number value is carried in the overhead of each of m$_1$ OTUC subframes in the OTUCm$_1$TG, the subframe number values from the first OTUC subframe to the m1th OTUC subframe are assigned as 1, 2, 3, . . . , m$_1$, respectively. One subframe number value is carried in the overhead of each of m$_2$ OTUC subframes in OTUCm$_2$TG, the subframe number values from the first OTUC subframe to the m$_2$th OTUC subframe are assigned as m$_1$+1, m$_1$+2, m$_1$+3, . . . , m$_1$+m$_2$, respectively; one subframe number value is carried in the overhead of each of m$_{(i-1)}$OTUC subframes in the m$_{(i-1)}$th OTUCm$_{(i-1)}$TG, the subframe number values from the first OTUC subframe to the m$_{(i-1)}$th OTUC subframe are assigned as m$_1$+m$_2$+ . . . + m$_{(i-2)}$+1, m$_1$+m$_2$+ . . . +m$_{(i-2)}$+2, m$_1$+m$_2$+ . . . +m$_{(i-2)}$+3, . . . , m$_1$+m$_2$+ . . . +m$_{(i-2)}$+m$_{(i-1)}$. One subframe number value is carried in the overhead of each of mi OTUC subframes in the m$_i$th OTUCmiTG, the subframe number values from the first OTUC subframe to the m$_i$th OTUC subframe are assigned as m$_1$+m$_2$+ . . . +m$_{(i-2)}$+m$_{(i-1)}$+1, m$_1$+m$_2$+ . . . +m$_{(i-2)}$+m$_{(i-1)}$+2, m$_1$+m$_2$+ . . . +m$_{(i-2)}$+m$_{(i-1)}$+3, . . . , m$_1$+m$_2$+ . . . +m$_{(i-2)}$+m$_{(i-1)}$+m$_i$. Where, n=m$_1$+m$_2$+ . . . +m$_{(i-2)}$+m$_{(i-1)}$+m$_i$. The TTIs in all the OTUC subframes are assigned as TTI1.

In step 603, before the OTUCm$_1$TG, OTUCm$_2$TG, OTUCm$_{(i-1)}$TG and OTUCm$_i$TG are transported to the node B at the far-end, a TTI (a desired TTI of the subframe to be received) carried in the OTUC subframe under the OTUCnAG to be received and a range of subframe number values of all the OTCU subframes in OTUCnAG in the OTUCmTG under the OTUCnAG to be received (a range of the desired subframe values of the subframe to be received) are configured for the node B by the administration plane or the control plane.

In the embodiment, for the TUCm1TG, the configured desired TTIs of the m$_1$ subframes are TTI1, for the m$_1$OTUC subframes in the OTUCm1TG, the range of the desired subframe number values is 1, 2, 3, . . . , m$_1$, the subframe number value of each OTUC subframe cannot be the same with each other, and it just belongs to [1, 2, 3, . . . , m$_1$].

For the OTUCm$_2$TG, the configured desired TTI of the m$_2$ subframes are TTI1, for the m$_2$ OTUC subframes in the OTUCm$_2$TG, the range of the desired subframe number values is m$_1$+1, m$_1$+2, m$_1$+3, . . . , m$_1$+m$_2$, the subframe number value of each OTUC subframe can not be the same with each other, and it just belongs to [m$_1$+1, m$_1$+2, m$_1$+3, . . . , m$_1$+m$_2$].

For the OTUC m$_{(i-1)}$TG, the configured desired TTIs of the m$_{(i-1)}$ subframes are TTI1, for the m$_{(i-1)}$ OTUC subframes in the OTUC m$_{(i-1)}$TG, the range of the desired subframe number values is m$_1$+m$_2$+ . . . +m$_{(i-2)}$+1, m$_1$+m$_2$+ . . . +m$_{(i-2)}$+2, m$_1$+m$_2$+ . . . +m$_{(i-2)}$+3, . . . , m$_1$+m$_2$+ . . . +m$_{(i-2)}$+m$_{(i-1)}$, the subframe number value of each OTUC subframe cannot be the same with each other, and it just belongs to [m$_1$+m$_2$+ . . . +m$_{(i-2)}$+1, m$_1$+m$_2$+ . . . + m$_{(i-2)}$+2, m$_1$+m$_2$+ . . . +m$_{(i-2)}$+3, . . . , m$_1$+m$_2$+ . . . + m$_{(i-2)}$+m$_{(i-1)}$].

For the OTUCm$_i$TG, the configured desired TTI of m$_i$ subframes are TTI1, for the m$_i$ OTUC subframes in the OTUCm$_i$TG, the range of the desired subframe number values is m$_1$+m$_2$+ . . . +m$_{(i-2)}$+m$_{(i-1)}$+1, m$_1$+m$_2$ . . . m$_{(i-2)}$+ m$_{(i-1)}$+2, m$_1$+m$_2$+ . . . +m$_{(i-2)}$+m$_{(i-1)}$+3, . . . , m$_1$+m$_2$+ . . . + m$_{(i-2)}$+m$_{(i-1)}$+m$_i$, the subframe number value of each OTUC subframe cannot be the same with each other, and it just belongs to [m$_1$+m$_2$+ . . . +m$_{(i-2)}$+m$_{(i-1)}$+1, m$_1$+m$_2$+ . . . + m$_{(i-2)}$+m$_{(i-1)}$+2, m$_1$+m$_2$+ . . . +m$_{(i-2)}$+m$_{(i-1)}$+3, . . . , m$_1$+m$_2$+ . . . +m$_{(i-2)}$+m$_{(i-1)}$+m$_i$].

In step 604, after the OTUCm$_1$TG, OTUCm$_2$TG, OTUCm$_{(i-1)}$TG and OTUCm$_i$TG are transported to the node B at the far-end, for each received OTUC frame, the node B firstly compares whether the TTI value carried in the overhead of the OTUC frame equals to the configured desired TTI value in step 603, if the TTI value carried in the overhead of the OTUC frame does not equal to the configured desired TTI value, an alarm for subframe misordering is generated.

In step 605, when the TTI carried in each received OTUC subframe is same with the configured desired TTI, it is to compare whether the subframe number values of all the OTUC subframes in the OTUCmTG belong to the configured range of the desired subframe number values.

In the embodiment:

Preferably, it is to compare whether the subframe number values of m$_1$ OTUC subframes in the OTUCm$_1$TG belong to the configured range of the desired subframe number values, i.e. [1, 2, 3, . . . , m$_1$], if not, the alarm for OTUC subframe misordering is generated, otherwise, it is not needed to generate any alarm.

Preferably, it is to compare whether the subframe number values of m$_2$ OTUC subframes in the OTUCm$_2$TG belong to the configured range of the desired subframe number values, i.e. [m$_1$+1, m$_1$+2, m$_1$+3, . . . , m$_1$+m$_2$], if not, the alarm for OTUC subframe misordering is generated, otherwise, it is not needed to generate any alarm.

Preferably, it is to compare whether the subframe number values of m$_{(i-1)}$ OTUC subframes in the OTUCm$_{i-1}$)TG belong to the configured range of the desired subframe number values, i.e. [m$_1$+m$_2$+ . . . +m$_{(i-2)}$+1, m$_1$+m$_2$ . . . + m$_{(i-2)}$+2, m$_1$+m$_2$ . . . +m$_{(i-2)}$+3, . . . , m$_1$+m$_2$+ . . . + m$_{(i-2)}$+m$_{(i-1)}$], if not, the alarm for OTUC subframe misordering is generated, otherwise, it is not needed to generate any alarm.

Preferably, it is to compare whether the subframe number values of m$_i$ OTUC subframes in the OTUCm$_i$TG belong to the configured range of the desired subframe number values, i.e. [m$_1$+m$_2$+ . . . +m$_{(i-2)}$+m$_{(i-1)}$+1, m$_1$+m$_2$+ . . . +m$_{(i-2)}$+ m$_{(i-1)}$+2, m$_1$+m$_2$+ . . . +m$_{(i-2)}$+m$_{(i-1)}$+3, . . . , m$_1$+m$_2$+ . . . + m$_{(i-2)}$+m$_{(i-1)}$+m$_i$], if not, the alarm for OTUC subframe misordering is generated, otherwise, it is not needed to generate any alarm.

Embodiment Two

Figure 7:
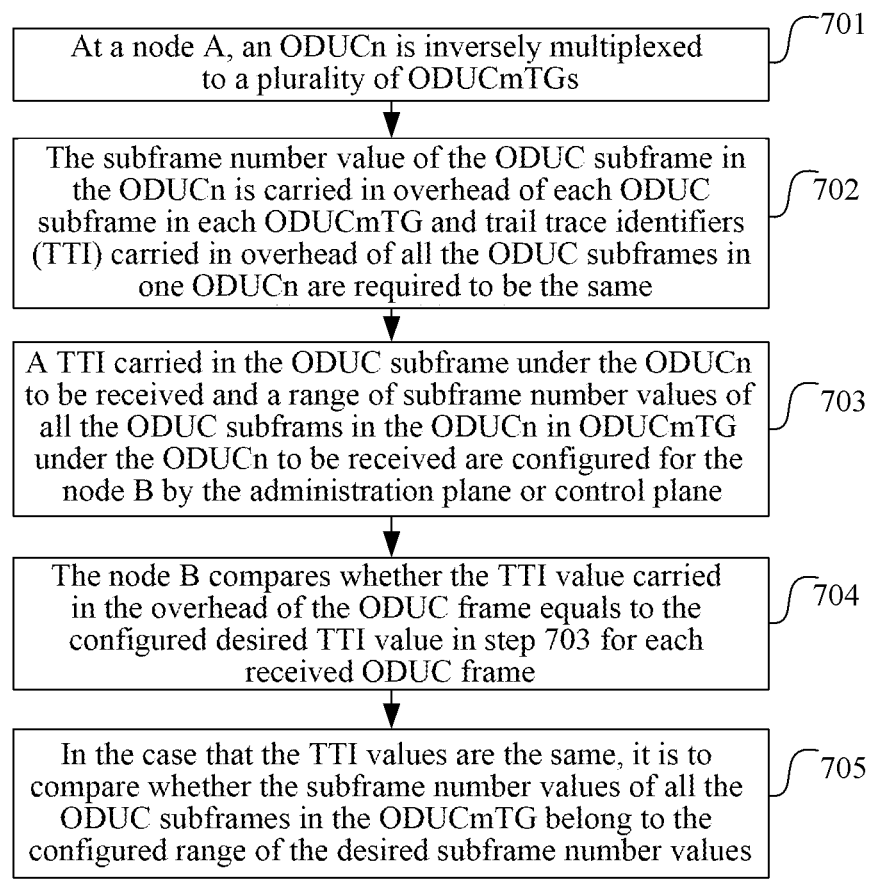
FIG. 7 is a flowchart of another method of detecting subframe misordering in inverse multiplexing in the embodiment corresponding to FIG. 5.

As shown in FIG. 5 and FIG. 7, the embodiment provides the method for detecting misordering by illustrating that misordering occurs for f an ODUC subframe in a certain ODUCn in a node B, which solves the problem that, after misordering occurs for the ODUC subframe in the ODUCn, the ODUCn frame cannot be assembled correctly.

In step 701, at a node A, an ODUCn is inversely multiplexed to a plurality of ODUCm transport groups (ODUCmTG), which are $ODUCm_1TG$, $ODUCm_2TG$ . . . , $ODUCm_{(i-1)}TG$ and $ODUCm_iTG$ respectively and are formed by means of $m_1$, $m_2$ . . . $m_{(i-1)}$ and $m_i$ OTUC subframes byte-interleaving, and each of the ODUCmTGs is mapped to one OTUCmTG;

The ODUC subframe is a subframe of 4*4080 currently defined in G.709.

In step 702, the subframe number value of the ODUC subframe in the ODUCn is carried in overhead of each ODUC subframe in each ODUCmTG and the trail trace identifiers (TTI) carried in overhead of all the ODUC subframes in one ODUCn are required to be the same, indicating that these ODUC subframes belong to the same ODUCn;

In the embodiment, one subframe number value is carried in the overhead of each of $m_1$ ODUC subframes in ODUC-$m_i$TG, the subframe number values from the first ODUC subframe to the $m_i$th ODUC are assigned as 1, 2, 3, . . . , $m_1$, respectively. One subframe number value is carried in the overhead of each of $m_2$ ODUC subframes in ODUC $m_2$TG, the subframe number values from the first ODUC subframe to the $m_2$th ODUC subframe are assigned as $m_1+1$, $m_1+2$, $m_1+3$, . . . , $m_1+m$, respectively; one subframe number value is carried in the overhead of each of $m_{(i-1)}$ ODUC subframes in the $m_{(i-1)}$th ODUCm(i-1)TG, the subframe number values from the first ODUC subframe to the $m_{(i-1)}$th ODUC subframe are assigned as $m_1+m_2+$ . . . $+m_{(i-2)}+1$, $m_1+m_2+$ . . . $+m_{(i-2)}+2$, $m_1+m_2+$ . . . $+m_{(i-2)}+3$, . . . , $m_1+m_2+$ . . . $+m_{(i-2)}+m_{(i-1)}$. One subframe number value is carried in the overhead of each of $m_i$ ODUC subframes in the $m_i$th ODUCm$_i$TG, the subframe number values from the first ODUC subframe to the $m_i$th ODUC subframe are assigned respectively as $m_1+m_2+$ . . . $+m_{(i-2)}+m_{(i-1)}+1$, $m_1+m_2+$ . . . $+m_{(i-2)}+m_{(i-1)}2$, $m_1+m_2+$ . . . $+m_{(i-2)}+m_{(i-1)+}3$, . . . , $m_1+m_2+$ . . . $+m_{(i-2)}+m_{(i-1)}+m_i$. Where $n=m_1+m_2+$ . . . $+m_{(i-2)}+m_{(i-1)}+m_i$. The TTI in all the ODUC subframes are assigned as TTI1.

In step 703, before the ODUC $m_1$TG, ODUC $m_2$TG, $ODUCm_{(i-1)}TG$ and $ODUCm_iTG$ are transported to the node B at the far-end, a TTI (a desired TTI of the subframe to be received) carried in the ODUC subframe under the ODUCn to be received and a range of subframe number values of all the ODUC subframes in ODUCn in the ODUCmTG under the ODUCn to be received (a range of the desired subframe values of the subframe to be received) are configured for the node B by the administration plane or the control plane;

In the embodiment, for the $ODUCm_1TG$, the configured desired TTI are TTI1, for the $m_1$ OTUC subframes in the $OTUCm_1TG$, the range of the desired subframe number values is 1, 2, 3, . . . , $m_1$, the subframe number value of each OTUC subframe cannot be the same with each other, and it just belongs to [1, 2, 3, . . . , $m_1$];

For the $TUCm_2TG$, the configured desired TTI of $m_2$ subframes are TTI1, for the $m_2$ ODUC subframes in the ODUC $m_2$TG, the range of the desired subframe number values is $m_1+1$, $m_1+2$, $m_1+3$, . . . , $m_1+m_2$, the subframe number value of each ODUC subframe cannot be the same with each other, and it just belongs to [$m_1+1$, $m_1+2$, $m_1+3$, . . . , $m_1+m_2$];

For the $ODUCm_{(i-1)}TG$, the configured desired TTIs of the $m_{(i-1)}$ subframes are TTI1, for the $m_{(i-1)}$ ODUC subframes in the ODUC $m_{(i-1)}$TG, the range of the desired subframe number values is $m_1+m_2+$ . . . $+m_{(i-2)}+1$, $m_1+m_2+$ . . . $+m_{(i-2)}+2$, $m_1+m_2+$ . . . $+m_{(i-2)}+3$, . . . , $m_1+m_2+$ . . . $+m_{(i-2)}+m_{(i-1)}$, the subframe number value of each ODUC subframe cannot be the same with each other, and it just belongs to [$m_1+m_2+$ . . . $+m_{(i-2)}+1$, $m_1+m_2+$ . . . $+m_{(i-2)}+2$, $m_1+m_2+$ . . . $+m_{(i-2)+}3$, . . . , $m_1+m_2+$ . . . $+m_{(i-2)}+m_{(i-1)}$].

For the $ODUCm_iTG$, the configured desired TTI of $m_i$ subframes are TTI1, for the $m_i$ ODUC subframes in the ODUC $m_i$TG, the range of the desired subframe number values is $m_1+m_2+$ . . . $+m_{(i-2)}+m_{(i-1)+}1$, $m_1+m_2+$ . . . $+m_{(i-2)}+m_{(i-1)+}2$, $m_1+m_2+$ . . . $+m_{(i-2)}+m_{(i-1)+}3$, . . . , $m_1+m_2+$ . . . $+m_{(i-2)}+m_{(i-1)}+m_i$, the subframe number value of each ODUC subframe cannot be the same with each other, and it just belongs to [$m_1+m_2+$ . . . $+m_{(i-2)}+m_{(i-1)}+1$, $m_1+m_2+$ . . . $+m_{(i-2)}+m_{(i-1)+}2$, $m_1+m_2+$ . . . $+m_{(i-2)}+m_{(i-1)+}3$ . . . , $m_1+m_2+$ . . . $+m_{(i-2)}+m_{(i-1)}+m_i$].

In step 704, after the $ODUCm_1TG$, $ODUCm_2TG$, $ODUCm_{(i-1)}TG$ and $ODUCm_iTG$ are transported to the node B at the far-end, for each received ODUC frame, the node B firstly compares whether the TTI value carried in the overhead of the ODUC frame equals to the configured desired TTI value in step 703, if the TTI value carried in the overhead of the ODUC frame does not equal to the configured desired TTI value, an alarm for subframe misordering is generate;

In step 705, in the case that the TTI values are the same, it is to compare whether the subframe number values of all the ODUC subframes in the ODUCmTG belong to the configured range of the desired subframe number values.

In the embodiment:

Preferably, it is to compare whether the subframe number values of $m_1$ ODUC subframes in the ODUC m1TG belong to the configured range of the desired subframe number values, i.e. [1, 2, 3, . . . , $m_1$], if not, the alarm for OTUC subframe misordering is generated, otherwise, it is not needed to generate any alarm.

Preferably, it is to compare whether the subframe number values of $m_2$ ODUC subframes in the $ODUCm_2TG$ belong to the configured range of the desired subframe number values, i.e. [$m_1+1$, $m_1+2$, $m_1+3$, . . . , $m_1+m_2$], if not, the alarm for ODUC subframe misordering is generated, otherwise, it is not needed to generate any alarm.

Preferably, it is to compare whether the subframe number values of $m_{(i-1)}$ ODUC subframes in the $ODUCm_{(i-1)}TG$ belong to the configured range of the desired subframe number values, i.e. [$m_1+m_2+$ . . . $+m_{(i-2)}+1$, $m_1+m_2+$ . . . $+m_{(i-2)}+2$, $m_1+m_2+$ . . . $+m_{(i-2)}3$, . . . , $m_1+m_2+$ . . . $+m_{(i-2)}+m_{(i-1)}$], if not, the alarm for ODUC subframe misordering is generated, otherwise, it is not needed to generate any alarm.

Preferably, it is to compare whether the subframe number values of $m_i$ OTUC subframes in the ODUCm$_i$TG belong to the configured range of the desired subframe number values, i.e. [$m_1+m_2+$ . . . $+m_{(i-2)}+m_{(i-1)}+1$, $m_1+m_2+$ . . . $+m_{(i-2)}+m_{(i-1)}+2$, $m_1+m_2+$ . . . $+m_{(i-2)}+m_{(i-1)}+3$, . . . , $m_1+m_2+$ . . . $+m_{(i-2)}+m_{(i-1)}+m_i$], if not, the alarm for ODUC subframe misordering is generated, otherwise, it is not needed to generate any alarm.

In conclusion, the embodiments of the present document provide the method for processing the mapping and multiplexing of the data and the corresponding optical node.

Figure 8:
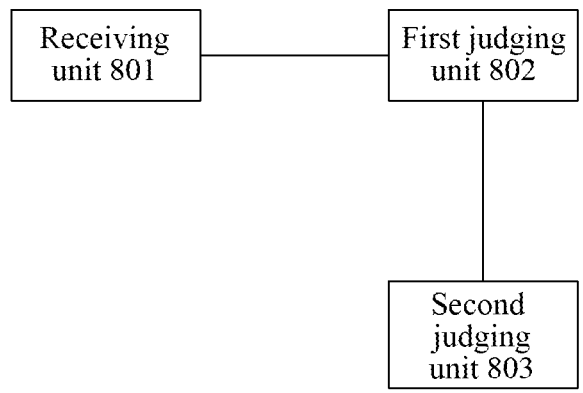
FIG. 8 is a diagram of a framework of a node according to the embodiment of the present document.

As show in FIG. 8, the embodiment provides a node, comprising: a receiving unit 801, a first judging unit 802 and a second judging unit 803, and wherein:

the receiving unit 801 is configured to receive subframes from a transmitting node;

the first judging unit 802 is configured to judge whether a trail trace identifier carried in each subframe received is same with a desired trail trace identifier of a subframe to be received; and the second judging unit 803 is configured to, when the first judging unit has judged that the trail trace identifier carried in each subframe received is same with the desired trail trace identifier of the subframe to be received, judge whether a subframe number value carried in each subframe belongs to a range of desired subframe number values of the subframe to be received, and if it has been judged that the subframe number value carried in the received subframe does not belong to the range of the desired subframe number values of the subframe to be received, determine that there is subframe misordering.

When the subframe is an optical channel transport unit for continue rate (OTUC) subframe, the desired trail trace identifier of the subframe to be received is a trail trace identifier carried in an OTUC subframe under an OTUC high-speed administrative group (OTUCnAG) to be received, wherein OTUC subframes under a same OTUC-nAG carry same trail trace identifiers.

the receiving unit is configured to receive OTUC subframes under a plurality of OTUC high-speed transport groups (OTUCmTG) to which an OTUCnAG to be received is inversely multiplexed, respectively; wherein the range of the desired subframe number values of the subframe to be received is a range of the subframe number values of the OTUC subframe in the OTUCnAG in the OTUCmTG under the OTUCnAG to be received; and the second judging unit is configured to judge whether a subframe number value carried in each OTUC under each OTUCmTG received belongs to a range of subframe number values of the OTUC subframe in the OTUCnAG in a corresponding OTUCmTG under the OTUCnAG to be received, if it has been judged that the subframe number value does not belong to the range of the subframe number values of the OTUC subframe in OTUCnAG in the corresponding OTUCmTG, determine that there is subframe misordering.

When the subframe is an optical channel data unit for continue rate (ODUC) subframe, the desired trail trace identifier of the subframe to be received is a trail trace identifier carried in an ODUC subframe under an ODUC high-speed (ODUCn) to be received, wherein ODUC subframes under a same ODUC carry same trail trace identifiers.

the receiving unit is configured to receive ODUC subframes a plurality of ODUCmTGs to which a plurality of the ODUCmTGs, to which the ODUCn to be received is inversely multiplexed, are mapped respectively; wherein the range of desire subframe number values of the subframe to be received is a range of subframe number values of the OTUC subframe in ODUCn in the ODUCmTG under the ODUCn to be received; and the second judging unit is configured to judge whether a subframe number value carried in each ODUC under each ODUCmTG received belongs to a range of subframe number values of an ODUC subframe in the ODUCn in a corresponding ODUCmTG under an ODUCn to be received, if it has been judged that the subframe number value carried in the received subframe does not belong to the range of the subframe number values of the ODUC subframe in the ODUCn in the corresponding ODUCmTG, determine that there is subframe misordering.

Apparently, the skilled in the art should understand that the modules or steps of the present document mentioned above can be implemented through a universal calculating device, and they can be integrated on a single calculating device or distributed in a network consisting of multiple calculating devices. Alternatively, the modules or steps can be implemented through program codes which can be executed by the calculating device, thus, they can be stored in a storage device to be executed by the calculating device, or they can be made into multiple integrated circuit modules respectively, or multiple modules or steps of them can be made into a single integrated circuit module to be implemented. Therefore, the present document is not limited to any specific combination of hardware and software.

The above description is only the preferable embodiments of the present document, and is not used to limit the present document, for those skilled in the art, the present document can have various modifications and changes. Any modification, equivalent substitution, improvement and the like made within the spirit and the principle of the present document shall be included in the protection scope of the present document.

INDUSTRIAL APPLICABILITY

In the embodiments of the present document, when a trail trace identifier carried in each of received subframes is same with a desired trail trace identifier of a subframe to be received, it is to judge that whether the subframe number value carried in each subframe belongs to the range of the desired subframe number values of the subframe to be received, therefore it can more accurately and effectively detect whether subframe misordering occurs.

What is claimed is:

1. A method for detecting subframe misordering in inverse multiplexing, comprising:
    a receiving node receiving subframes from a transmitting node, judging whether a trail trace identifier carried in each subframe received is same with a desired trail trace identifier of a subframe to be received; and
    if the trail trace identifier carried in each subframe received is same with the desired trail trace identifier of the subframe to be received, the receiving node judging whether a subframe number value carried in each subframe belongs to a range of desired subframe number values of the subframe to be received, and if it has been judged that the subframe number value carried in the received subframe does not belong to the range of the desired subframe number values of the subframe to be received, determining that there is subframe misordering.

2. The method of claim 1, wherein,
    when the subframe is an optical channel transport unit for continue rate (OTUC) subframe, the desired trail trace identifier of the subframe to be received is a trail trace identifier carried in an OTUC subframe under an OTUC high-speed administrative group (OTUCnAG) to be received, wherein OTUC subframes under a same OTUCnAG carry same trail trace identifiers.

3. The method of claim 1, wherein,
    when the subframe is an optical channel data unit for continue rate (ODUC) subframe, the desired trail trace identifier of the subframe to be received is a trail trace identifier carried in an ODUC subframe under an ODUC high-speed (ODUCn) to be received, wherein ODUC subframes under a same ODUC carry same trail trace identifiers.

4. The method of claim 2, wherein, a receiving node receiving subframes from a transmitting node, comprises: receiving OTUC subframes under a plurality of OTUC high-speed transport groups (OTUCmTG) to which an OTUCnAG to be received has been inversely multiplexed, respectively; wherein the range of the desired subframe number values of the subframe to be received is a range of the subframe number values of the OTUC subframe in the OTUCnAG in the OTUCmTG under the OTUCnAG to be received; and judging whether a subframe number value carried in each subframe belongs to a range of desired subframe number values of the subframe to be received, comprises: judging whether a subframe number value carried in each OTUC subframe under each OTUCmTG received belongs to a range of subframe number values of the OTUC subframe in the OTUCnAG in a corresponding OTUCmTG under the OTUCnAG to be received, if it has been judged that a subframe number value carried in the received subframe does not belong to the range of subframe number values of the OTUC subframe in the OTUCnAG in the corresponding OTUCmTG, determining that there is subframe misordering.

5. The method of claim 3, wherein, a receiving node receiving subframes from a transmitting node, comprises: receiving ODUC subframes under a plurality of OTUCmTGs to which a plurality of the ODUCmTGs, to which the ODUCn to be received is inversely multiplexed, are respectively mapped; wherein the range of desire subframe number values of the subframe to be received is a range of subframe number values of the OTUC subframe in ODUCn in the ODUCmTG under the ODUCn to be received; and judging whether a subframe number value carried in each subframe belongs to a range of desired subframe number values of the subframe to be received, comprises: judging whether a subframe number value carried in each ODUC subframe under each ODUCmTG received belongs to a range of subframe number values of an ODUC subframe in the ODUCn in a corresponding ODUCmTG under an ODUCn to be received, if it has been judged that the subframe number value carried in the received subframe does not belong to the range of the subframe number values of the ODUC subframe in the ODUCn in the corresponding ODUCmTG, determining that there is subframe misordering.

6. The method of claim 1, wherein, the desired trail trace identifier of the subframe to be received is configured for the receiving node by an administration plane or a control plane; the range of the desire subframe number values is configure for the receiving node by the administration plane or the control plane.

7. The method of claim 1, further comprising:

after judging that the trail trace identifier carried in the received subframe is different from the desired trail trace identifier of the subframe to be received, the receiving node determining that there is subframe misordering; and after determining that there is subframe misordering, the receiving node generating an alarm for the subframe misordering.

8. A node comprising: a receiving unit, a first judging unit and a second judging unit, and wherein:

the receiving unit is configured to receive subframes from a transmitting node;

the first judging unit is configured to judge whether a trail trace identifier carried in each subframe received is same with a desired trail trace identifier of a subframe to be received; and the second judging unit is configured to, when the first judging unit has judged that the trail trace identifier carried in each subframe received is same with the desired trail trace identifier of the subframe to be received, judge whether a subframe number value carried in each subframe belongs to a range of desired subframe number values of the subframe to be received, and if it has been judged that the subframe number value carried in the received subframe does not belong to the range of the desired subframe number values of the subframe to be received, determine that there is subframe misordering.

9. The node of claim 8, wherein when the subframe is an optical transport unit for continue rate (OTUC) subframe, the desired trail trace identifier of the subframe to be received is a trail trace identifier carried in an OTUC subframe under an OTUC high-speed administrative group (OTUCnAG) to be received, wherein OTUC subframes under a same OTUCnAG carry same trail trace identifiers.

10. The node of claim 8, wherein when the subframe is an optical channel data unit for continue rate (ODUC) subframe, the desired trail trace identifier of the subframe to be received is a trail trace identifier carried in an ODUC subframe under an ODUC high-speed (ODUCn) to be received, wherein ODUC subframes under a same ODUC carry same trail trace identifiers.

11. The node of claim 9, wherein the receiving unit is configured to receive OTUC subframes under a plurality of OTUC high-speed transport group (OTUCmTG) to which an OTUCnAG to be received is inversely multiplexed, respectively; wherein the range of the desired subframe number values of the subframe to be received is a range of the subframe number values of the OTUC subframe in the OTUCnAG in the OTUCmTG under the OTUCnAG to be received; and the second judging unit is configured to judge whether a subframe number value carried in each OTUC subframe under each OTUCmTG received belongs to a range of subframe number values of the OTUC subframe in the OTUCnAG in a corresponding OTUCmTG under the OTUCnAG to be received, if it has been judged that the subframe number value carried in the received subframe does not belong to the range of the subframe number values of the OTUC subframe in the OTUCnAG in the corresponding OTUCmTG, determine that there is subframe misordering.

12. The node of claim 10, wherein the receiving unit is configured to receive ODUC subframes under a plurality of ODUCmTGs to which a plurality of the ODUCmTGs, to which the ODUCn to be received is inversely multiplexed, are mapped respectively; wherein the range of desire subframe number values of the subframe to be received is a range of subframe number values of the OTUC subframe in ODUCn in the ODUCmTG under the ODUCn to be received;

the second judging unit is configured to judge whether a subframe number value carried in each ODUC subframe under each ODUCmTG received belongs to a range of subframe number values of an ODUC subframe in the ODUCn in a corresponding ODUCmTG under an ODUCn to be received, if it has been judged that the subframe number value carried in the received subframe does not belong to the range of the subframe number values of the ODUC subframe in the ODUCn in the corresponding ODUCmTG, determine that there is subframe misordering.

13. The method of claim 2, further comprising:

after judging that the trail trace identifier carried in the received subframe is different from the desired trail trace identifier of the subframe to be received, the receiving node determining that there is subframe misordering; and after determining that there is subframe misordering, the receiving node generating an alarm for the subframe misordering.

14. The method of claim 3, further comprising:

after judging that the trail trace identifier carried in the received subframe is different from the desired trail trace identifier of the subframe to be received, the receiving node determining that there is subframe misordering; and after determining that there is subframe misordering, the receiving node generating an alarm for the subframe misordering.

15. The method of claim 4, further comprising:

after judging that the trail trace identifier carried in the received subframe is different from the desired trail trace identifier of the subframe to be received, the receiving node determining that there is subframe misordering; and after determining that there is subframe misordering, the receiving node generating an alarm for the subframe misordering.

16. The method of claim 5, further comprising:

after judging that the trail trace identifier carried in the received subframe is different from the desired trail trace identifier of the subframe to be received, the receiving node determining that there is subframe misordering; and after determining that there is subframe misordering, the receiving node generating an alarm for the subframe misordering.

* * * * *